(12) United States Patent
Omeara et al.

(10) Patent No.: US 10,144,502 B2
(45) Date of Patent: Dec. 4, 2018

(54) AERODYNAMIC STRUCTURES HAVING LOWER SURFACE SPOILERS

(71) Applicant: THE BOEING COMPANY, Chicago, IL (US)

(72) Inventors: Sean C. Omeara, Seattle, WA (US); Brian E. Geppert, Lynnwood, WA (US); Christopher Andrew Konings, Lynnwood, WA (US); Stephen Roger Amorosi, Seattle, WA (US); Paul M. Vijgen, Everett, WA (US); Kevin Mark Johnsen, Seattle, WA (US); Gregory M. Santini, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 189 days.

(21) Appl. No.: 15/065,128

(22) Filed: Mar. 9, 2016

(65) Prior Publication Data

US 2017/0259908 A1 Sep. 14, 2017

(51) Int. Cl.
  *B64C 9/04* (2006.01)
  *B64C 9/16* (2006.01)
  *B64C 9/32* (2006.01)
  *B64C 13/30* (2006.01)

(52) U.S. Cl.
  CPC .......... *B64C 9/04* (2013.01); *B64C 9/16* (2013.01); *B64C 9/32* (2013.01); *B64C 9/323* (2013.01); *B64C 13/30* (2013.01); *Y02T 50/44* (2013.01)

(58) Field of Classification Search
  CPC .... B64C 9/04; B64C 9/16; B64C 9/32; B64C 9/323; B64C 13/30; B64C 9/02
  See application file for complete search history.

(56) References Cited

U.S. PATENT DOCUMENTS

| 2,147,360 | A |   | 2/1939  | Zaparka |
|-----------|---|---|---------|---------|
| 2,730,313 | A | * | 1/1956  | Ringham ............... B64C 23/00 244/213 |
| 2,745,613 | A | * | 5/1956  | Harpoothian et al. .............. B64C 17/00 244/203 |
| 3,438,598 | A | * | 4/1969  | Tammel ................... B64C 9/16 244/216 |
| 3,721,406 | A |   | 3/1973  | Hurlbert |
| 3,774,869 | A |   | 11/1973 | Harmon |

(Continued)

FOREIGN PATENT DOCUMENTS

WO 2006084157 8/2006

OTHER PUBLICATIONS

European Patent Office, "European Search Resport" issued in connection with application No. 17159094.6 dated Jul. 17, 2017, 7 pages.

*Primary Examiner* — Philip J Bonzell
(74) *Attorney, Agent, or Firm* — Hanley, Flight and Zimmerman, LLC

(57) ABSTRACT

Aerodynamic structures having lower surface spoilers are described herein. One disclosed example apparatus includes a first spoiler of an aerodynamic structure of an aircraft, where the first spoiler is to deflect away from a first side of the aerodynamic structure and a second spoiler on a second side of the aerodynamic structure opposite of the first side, where the second spoiler is to deflect away from the second side to reduce a load on at least one of the first spoiler or a flap of the aerodynamic structure.

23 Claims, 13 Drawing Sheets

(56) References Cited

U.S. PATENT DOCUMENTS

| | | | |
|---|---|---|---|
| 4,566,657 A | | 1/1986 | Grow |
| 5,697,468 A | * | 12/1997 | Russell, Jr. .............. B60V 1/22 180/116 |
| 6,491,261 B1 | * | 12/2002 | Blake ........................ B64C 5/08 244/113 |
| 8,167,554 B2 | * | 5/2012 | Wang .................... F03D 1/0608 244/204.1 |
| 9,267,491 B2 | * | 2/2016 | Vossler ................. F03D 7/0252 |
| 2007/0284483 A1 | * | 12/2007 | Milliere .................... B64C 3/58 244/217 |
| 2011/0223022 A1 | * | 9/2011 | Wang .................... F03D 7/0252 416/23 |
| 2011/0223033 A1 | * | 9/2011 | Wang .................... F03D 1/0608 416/235 |
| 2012/0141271 A1 | * | 6/2012 | Southwick ............ F03D 1/0633 416/23 |
| 2015/0010400 A1 | * | 1/2015 | Vossler ................. F03D 7/0252 416/23 |

* cited by examiner

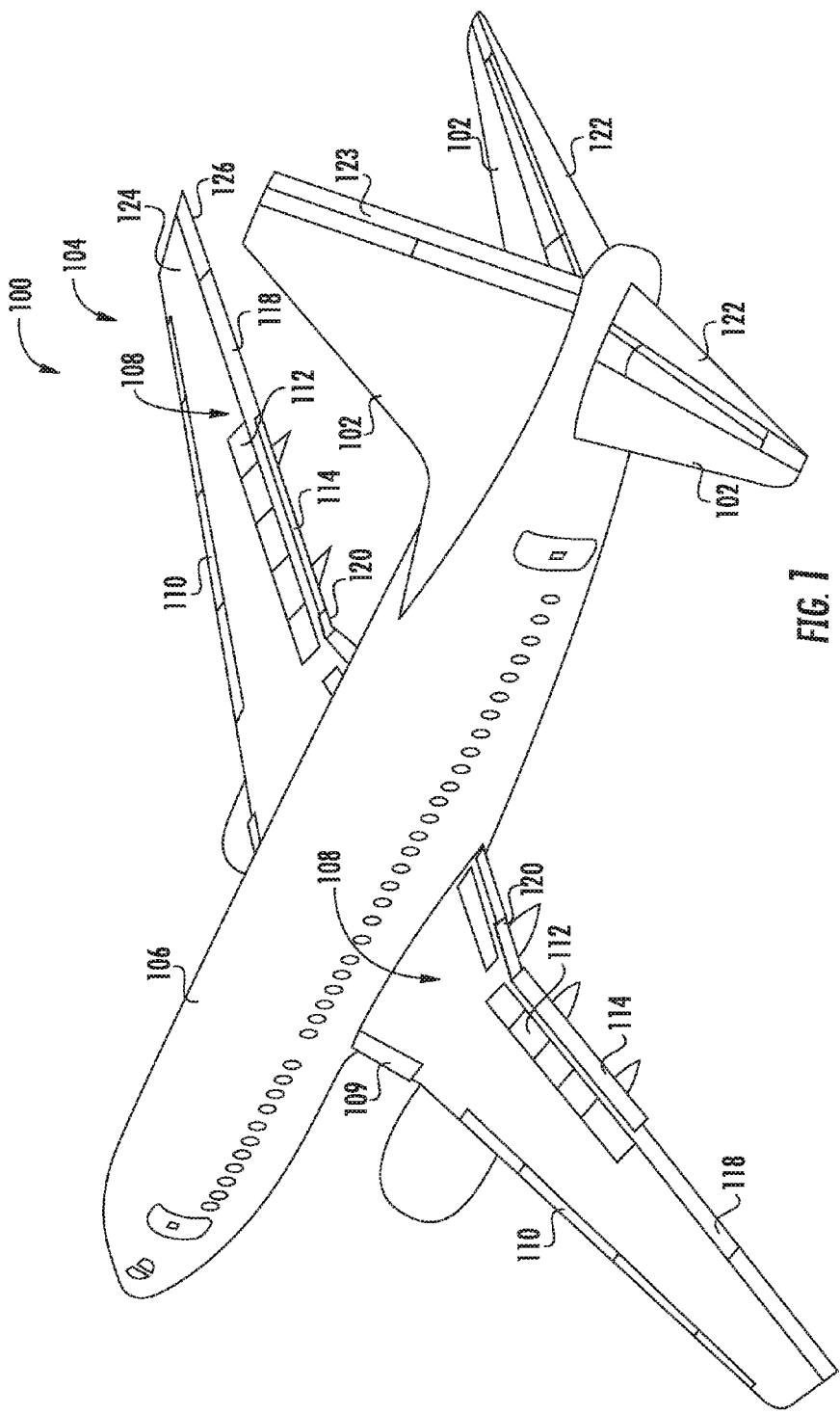

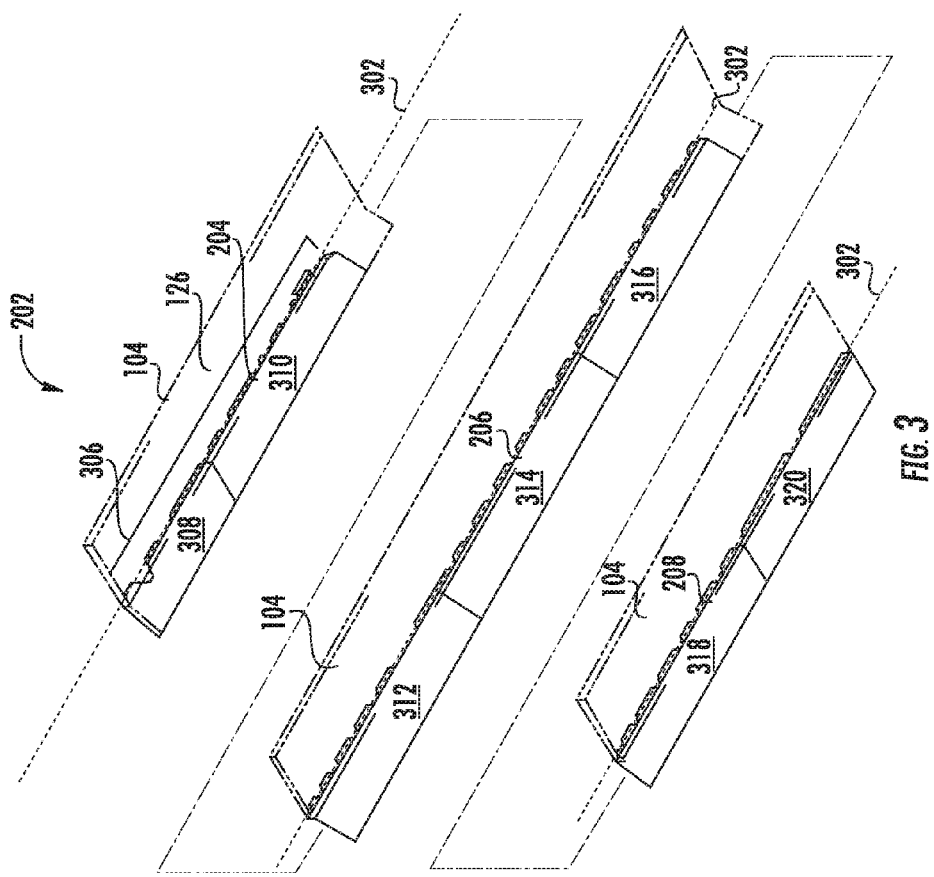
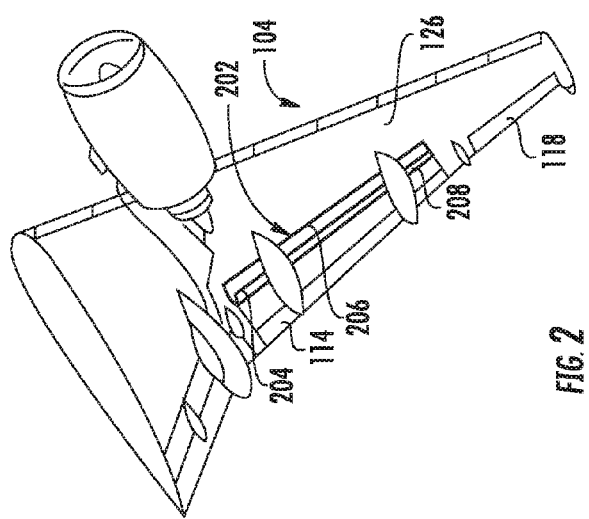

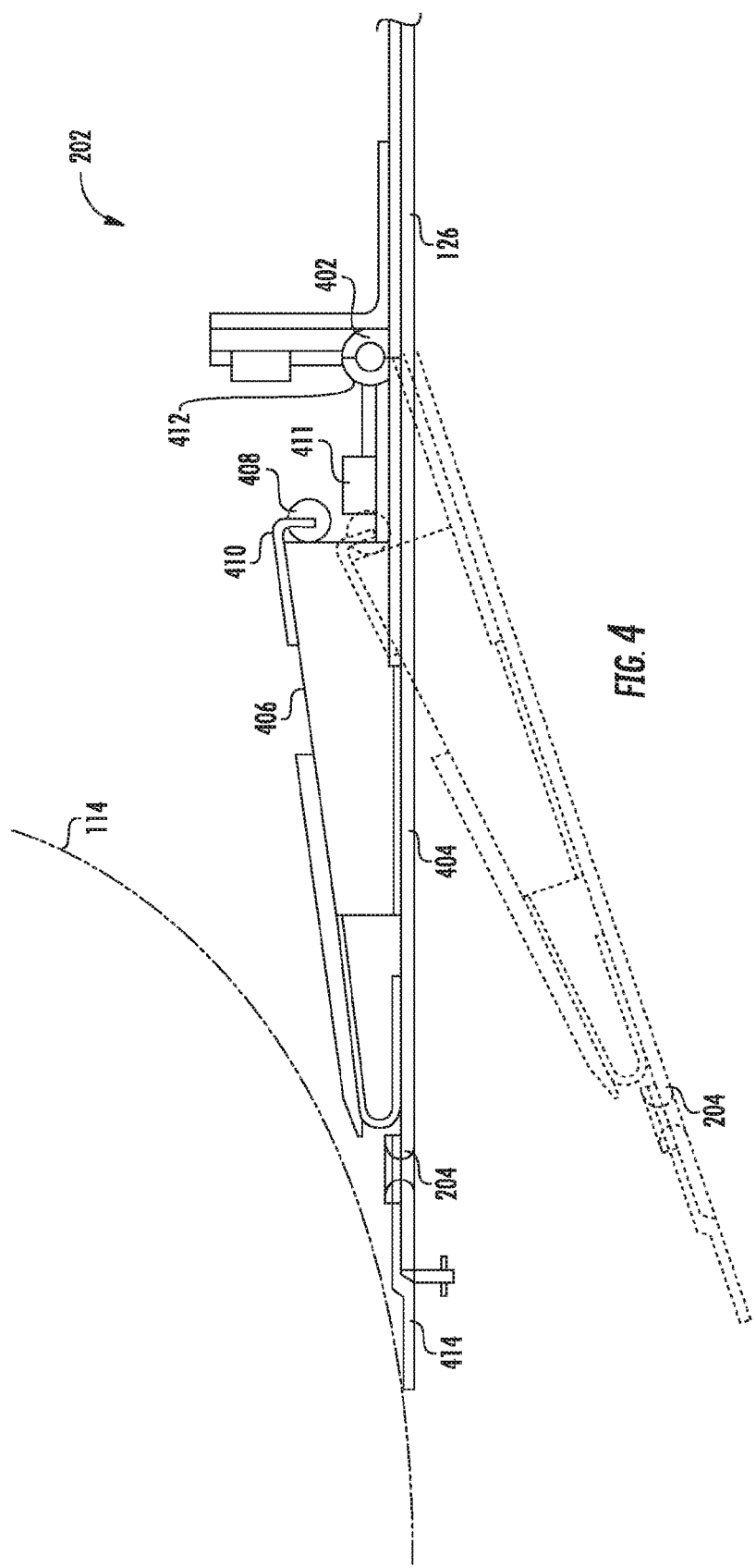

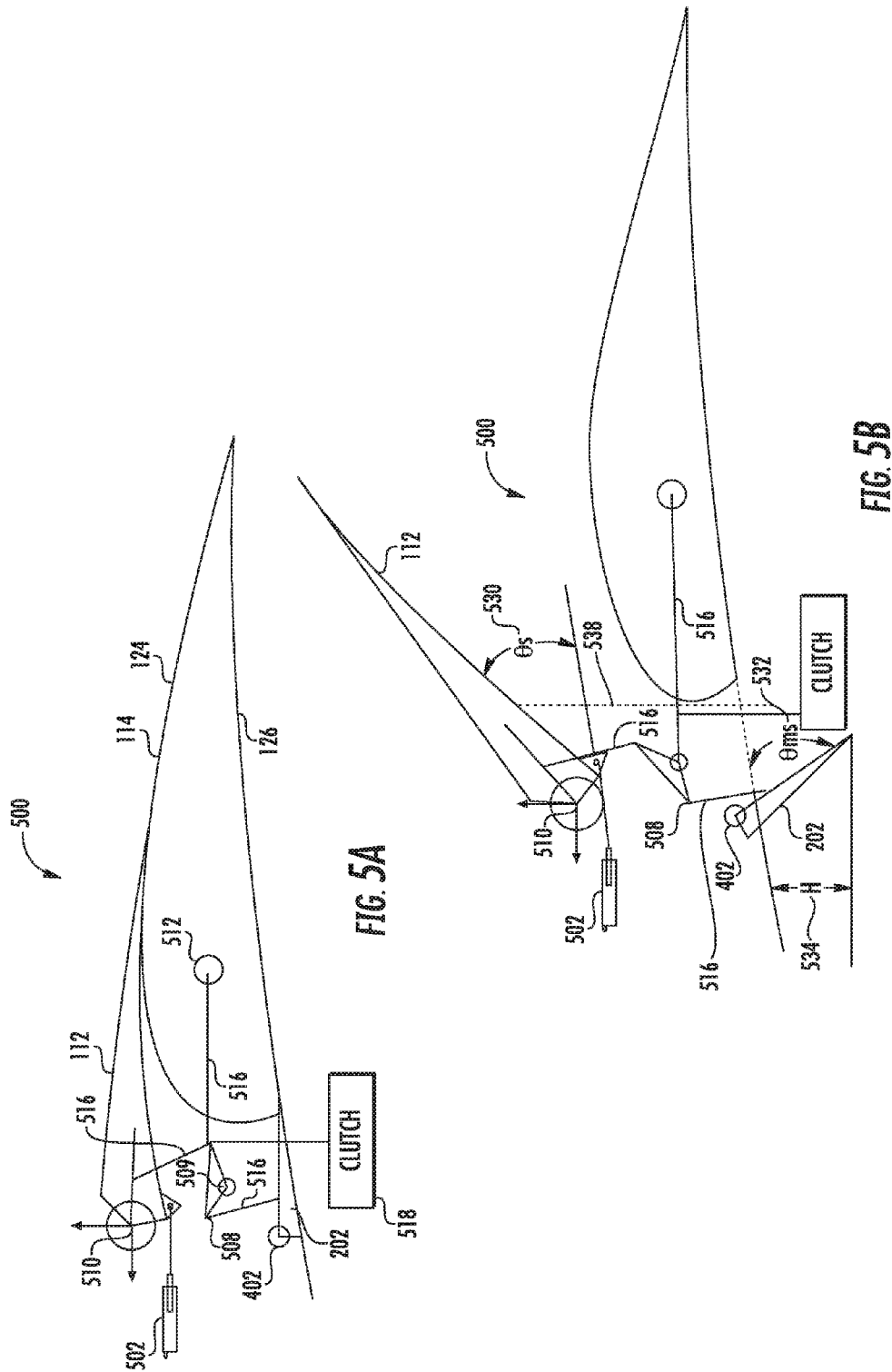

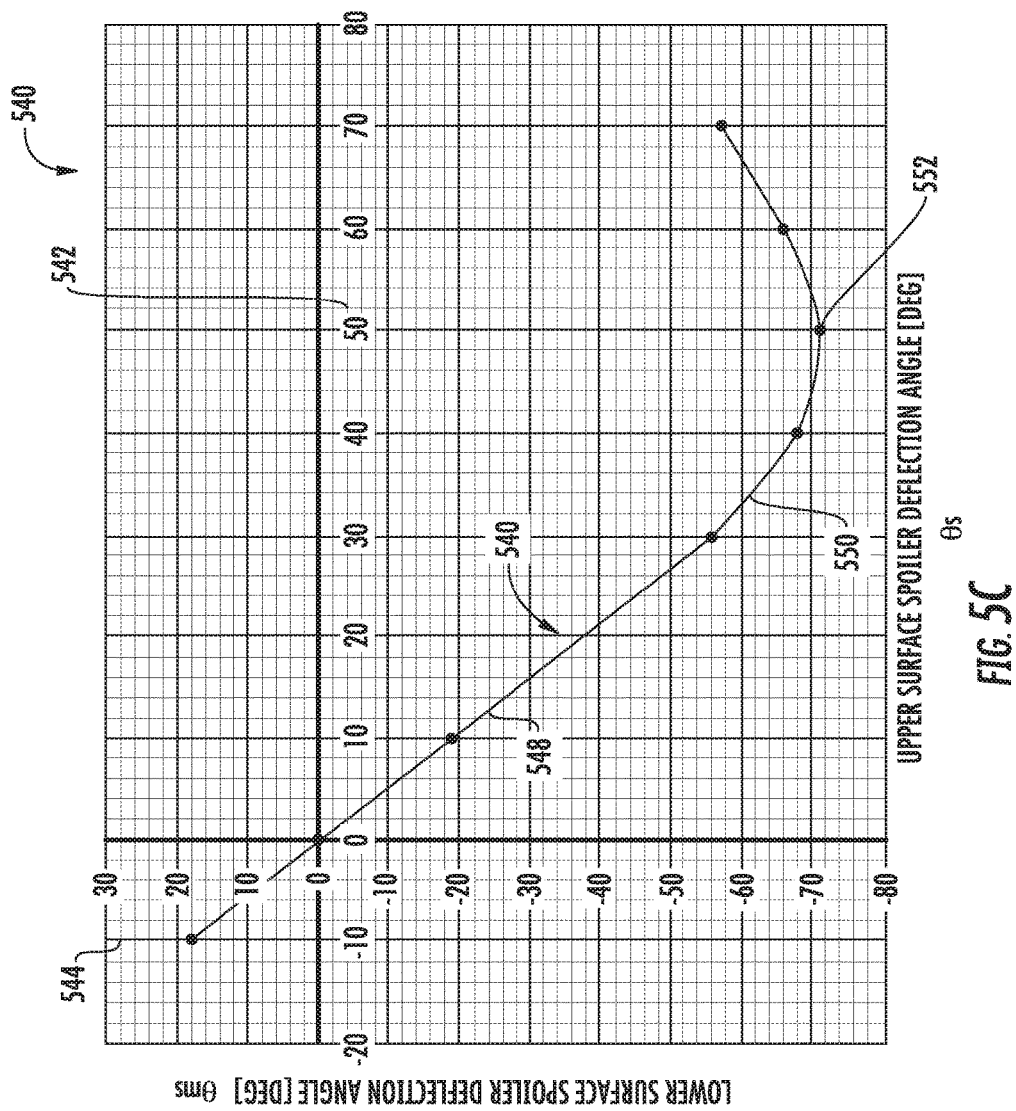

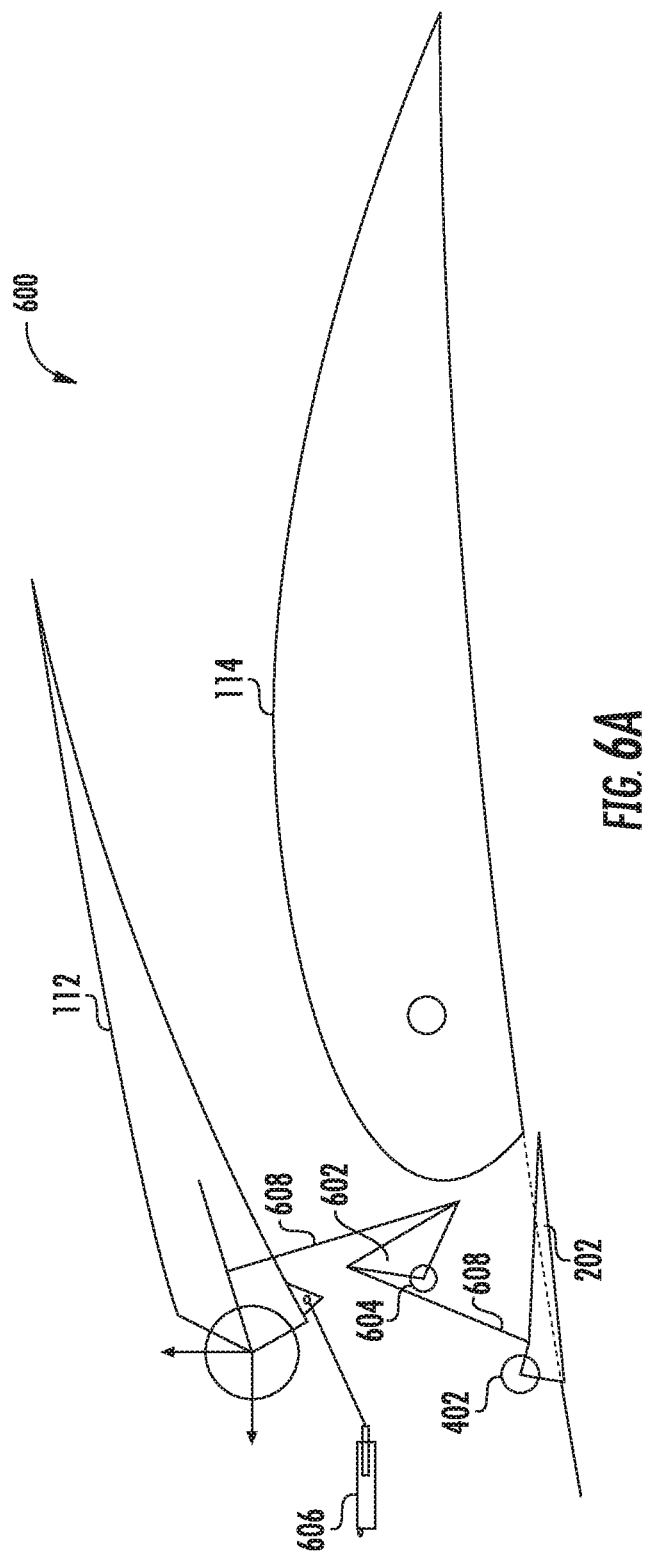

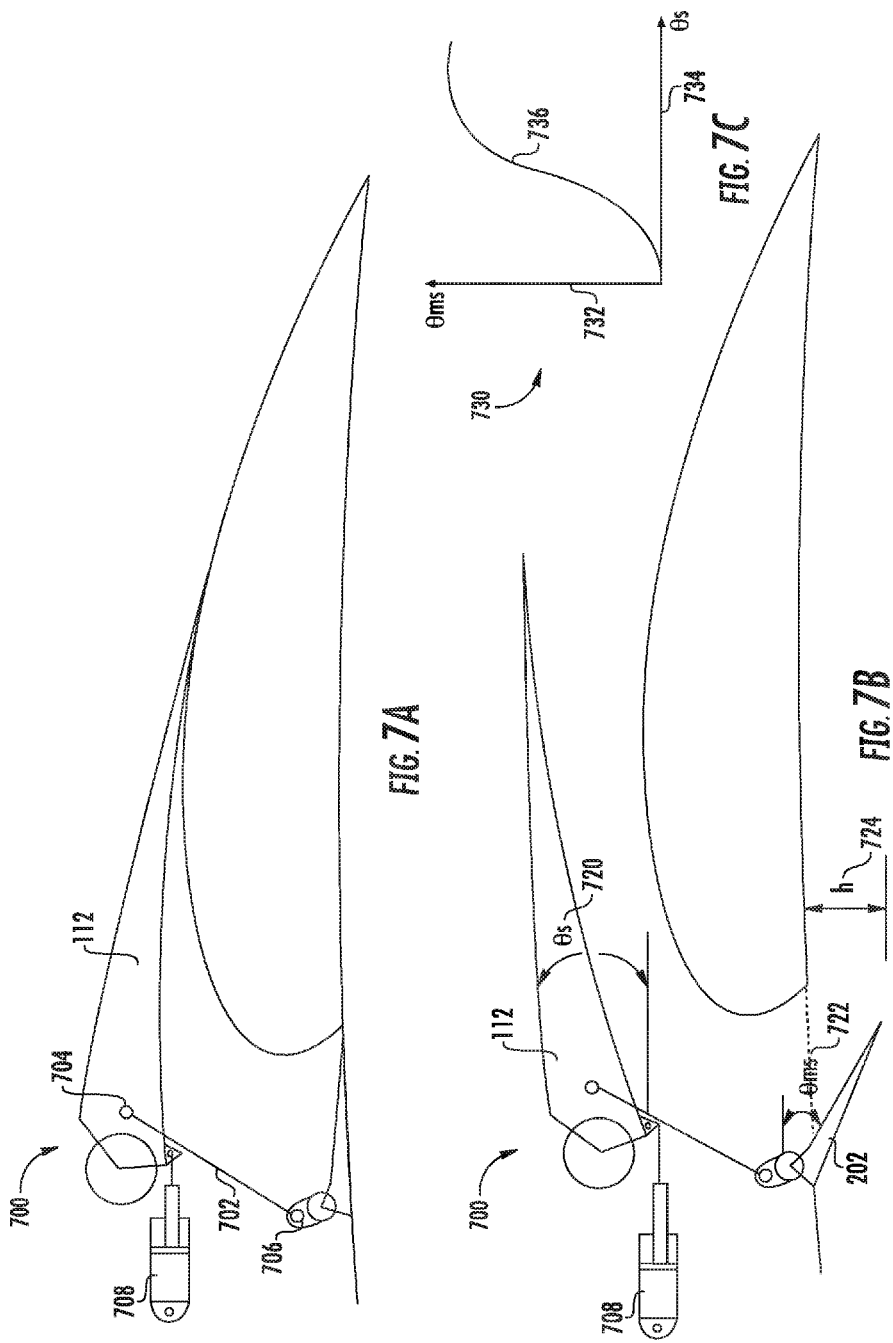

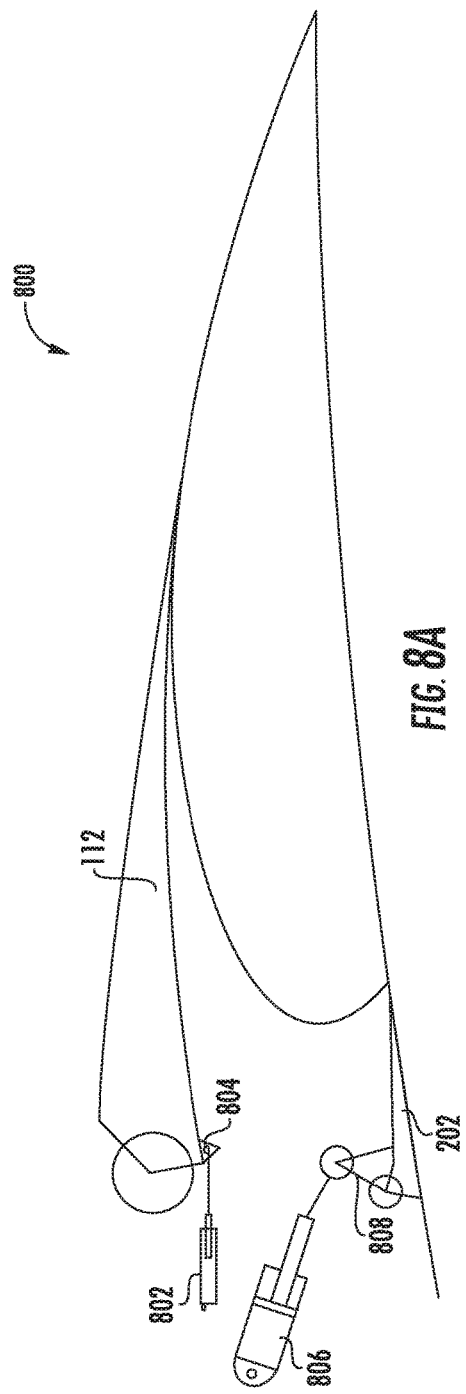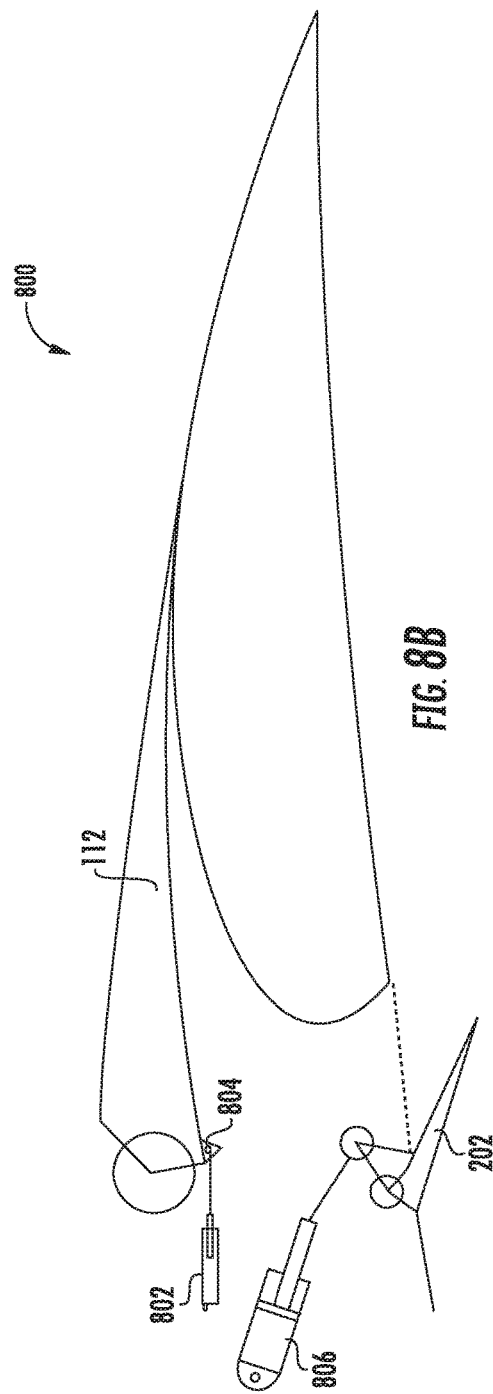

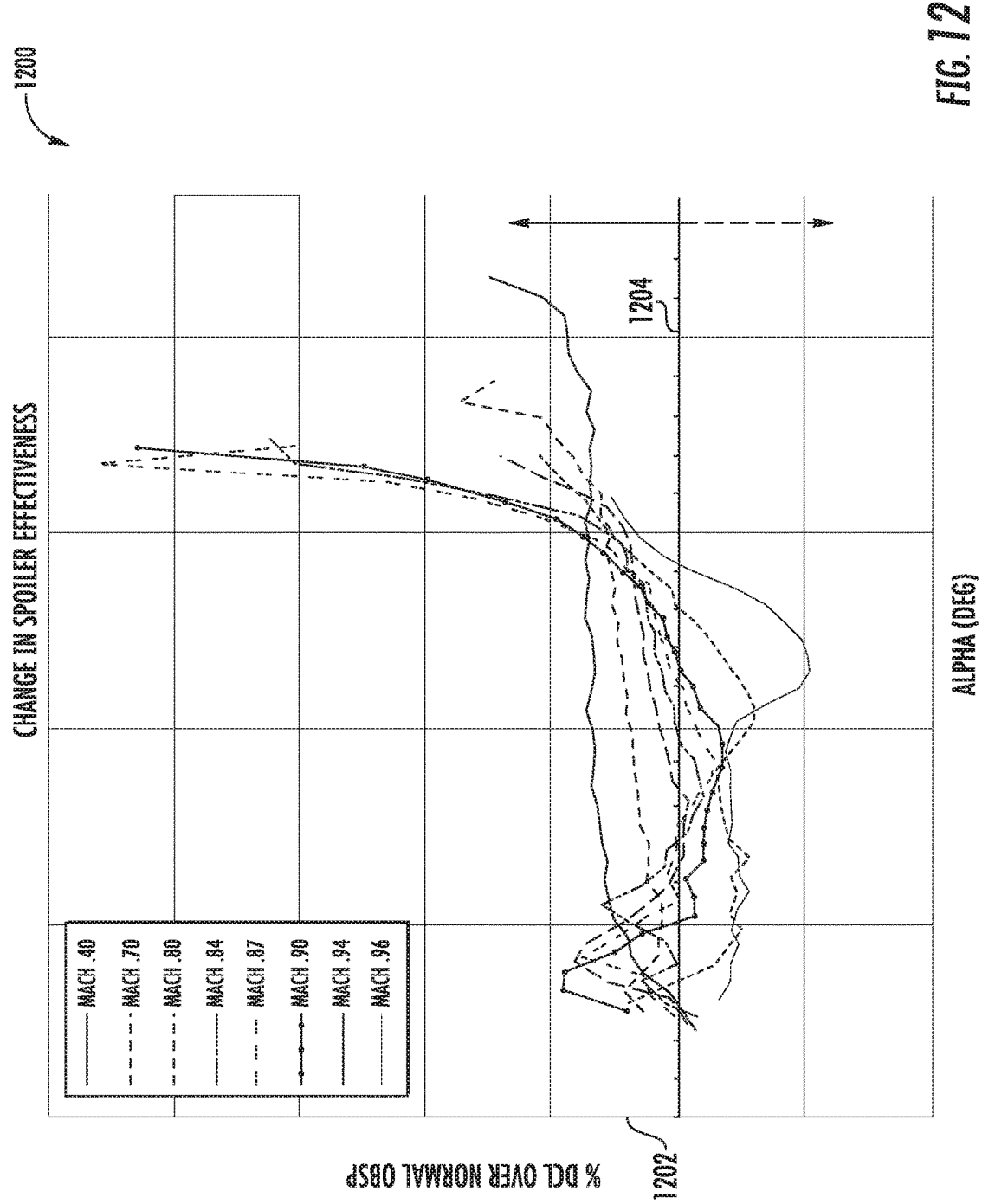

AERODYNAMIC STRUCTURES HAVING LOWER SURFACE SPOILERS

FIELD OF THE DISCLOSURE

This patent relates generally to aerodynamic structures and, more particularly, to aerodynamic structures having lower surface spoilers.

BACKGROUND

During flight maneuvers such as braking or a descent (e.g., a rapid descent) of an aircraft, aerodynamic surfaces (e.g., control surfaces) such as spoilers or flaps of aerodynamic structures (e.g., wings, stabilizers, etc.) may experience significant loads due to airflow over the control surfaces during flight (e.g., Mach numbers of greater than 0.5, ascent or descent, braking, etc.) of the aircraft, thereby necessitating structural reinforcements. Further, effectiveness of flaps and/or spoilers on a wing of an aircraft, for example, may be reduced due to such loads acting on these structures.

In some aircraft, flaps encounter significant forces/stresses when the aircraft is maneuvering at higher speeds (e.g., Mach numbers of 0.5 or higher) or undergoing an emergency maneuver such as a rapid descent at Mach numbers greater than 0.9 (e.g., transonic speeds, near-sonic speeds, etc.). The significant forces encountered may necessitate significant structural reinforcements and/or additional structural components to counteract stresses caused by these forces, thereby adding significant weight to the aircraft and, thus, reducing overall fuel efficiency of the aircraft. Further, significant loading of flaps may reduce the overall effectiveness of the flaps and flap actuations, and, as a result, the high forces and/or loads encountered by the flaps may reduce the ability of the flaps to displace/angle and/or move at a sufficient rate for maneuvering.

SUMMARY

An example apparatus includes a first spoiler of an aerodynamic structure of an aircraft, where the first spoiler is to deflect away from a first side of the aerodynamic structure and a second spoiler on a second side of the aerodynamic structure opposite of the first side, where the second spoiler is to deflect away from the second side to reduce a load on at least one of the first spoiler or a flap of the aerodynamic structure.

An example wing includes a first rotatable joint of the wing, where the first rotatable joint is to define a first axis of rotation of a first spoiler that is to deflect away from a first side of the wing along the first axis of rotation. The example wing also includes a second rotatable joint of the wing, where the second rotatable joint is to define a second axis of rotation of a second spoiler on a second side of the wing opposite the first side, and where the second spoiler is to deflect away from the second side along the second axis of rotation. The example wing also includes at least one linkage to operatively couple rotational motion of the second rotatable joint to rotational motion of the first rotatable joint.

An example method includes based on at least one of a flight input or a flight condition, rotating at least one of an upper surface spoiler that is positioned on a first side of an aerodynamic structure of the aircraft or a flap of the aerodynamic structure. The example method also includes rotating a lower surface spoiler positioned on a second side of an aerodynamic structure of the aircraft that is opposite of the first side to affect a load on at the least one of the upper surface spoiler or the flap that is rotated.

An example apparatus includes a first spoiler on a lower surface of a wing, the first spoiler to have a deployed height of approximately 1 to 2.5% of a chord length of the wing in a deployed state.

BRIEF DESCRIPTION OF THE DRAWINGS

FIG. 1 illustrates an example aircraft that may be used to implement example methods and apparatus disclosed herein.

FIG. 2 illustrates an example wing lower surface structure in which the examples disclosed herein can be implemented.

FIG. 3 is view of a portion of an example lower surface spoiler system in accordance with the teachings of this disclosure.

FIG. 4 is a cross-sectional view of a portion of the example lower surface spoiler system of FIG. 3.

FIGS. 5A and 5B illustrate undeployed and deployed states, respectively of an example actuation system that may be used in conjunction with the example lower surface spoiler system of FIGS. 3 and 4.

FIG. 5C illustrates an example angular displacement plot of the example actuation system of FIGS. 5A and 5B.

FIG. 6A is a cross-sectional view of an alternative example lower surface spoiler system in a deflected state.

FIGS. 7A and 7B illustrate undeployed and deployed states, respectively, of another example actuation system.

FIG. 7C illustrates an example angular displacement plot of the example actuation system of FIGS. 7A and 7B.

FIGS. 8A and 8B illustrate undeployed and deployed states, respectively of another example actuation system.

FIG. 12 is an example graph that illustrates spoiler effectiveness of the examples disclosed herein.

Figure 6B:
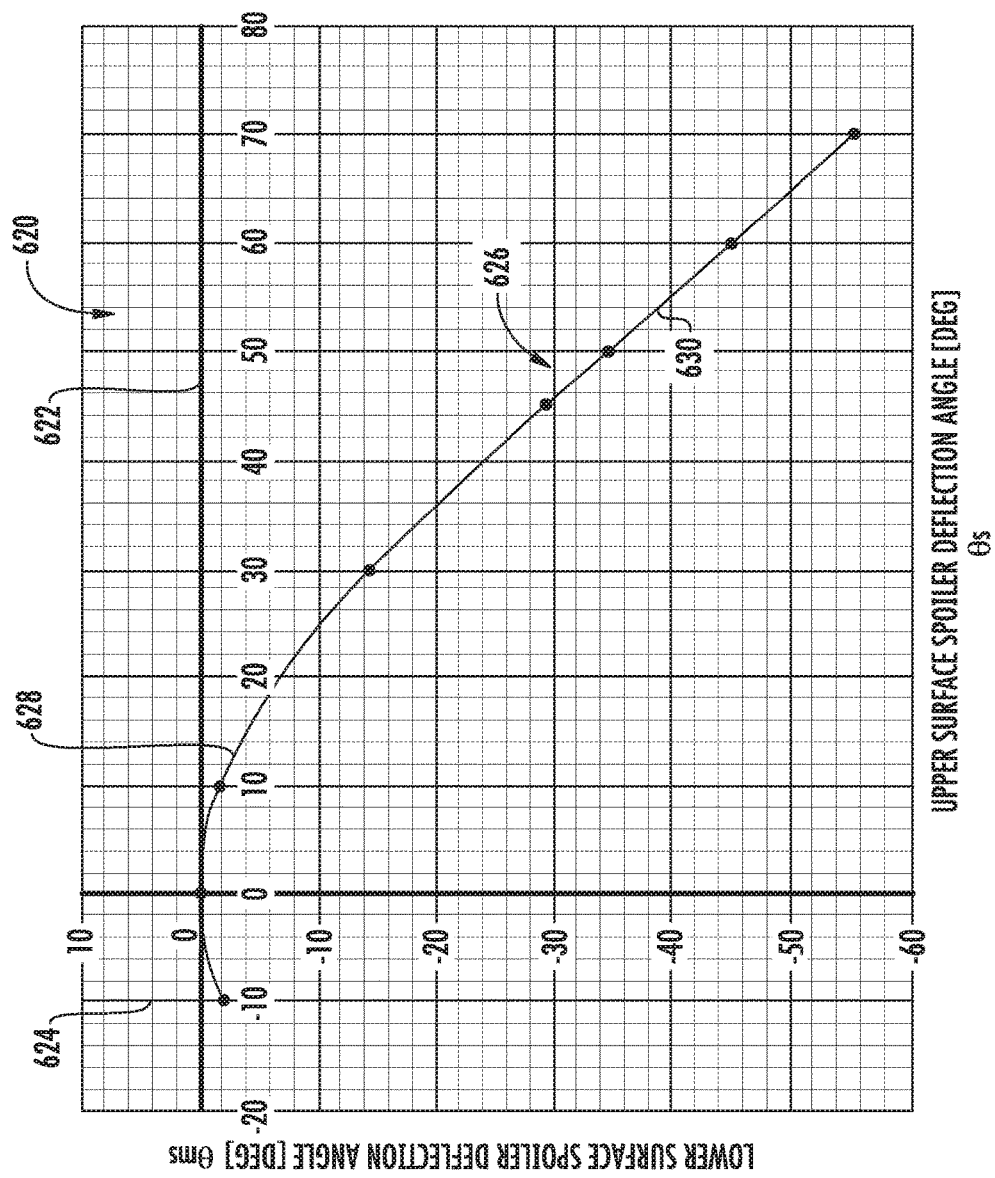
FIG. 6B illustrates an example angular displacement plot of the example actuation system of FIG. 6A.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Aerodynamic structures having lower surface spoilers are disclosed herein. During flight maneuvers, control surfaces (e.g., flaps, spoilers, ailerons, elevators, rudders, etc.) of an aircraft may work to provide the appropriate flight dynamics to maneuver the aircraft and/or control speed of the aircraft. In particular, the positions, angles, and/or deflections of one or more control surfaces (e.g., flaps, spoilers, etc.) may be varied to maneuver the aircraft. During these flight maneuvers control surfaces such as flaps or spoilers (e.g., control surfaces used to reduce lift of the aircraft) on a wing of an aircraft, for example, may encounter significant loads due to airflow associated with flight (e.g., high speed cruise and/or maneuvers). In particular, flaps and/or spoilers of an aircraft may encounter significant forces when the aircraft is maneuvering and/or braking at relatively high speeds (e.g., Mach numbers of 0.5 or higher) and/or performing an emergency maneuver such as a rapid descent at transonic Mach numbers that are around or greater than 0.9, for example. These significant forces may necessitate the flaps and/or spoilers to have significant structural reinforcements and/or additional strengthening components to counteract such forces, thereby requiring additional weight that may reduce overall fuel efficiency of the aircraft. Further, significant loading of these flaps may reduce the overall effectiveness of the flaps (e.g., ability to maneuver the aircraft).

The examples disclosed herein enable reduction of loads encountered by these control surfaces and, thus, also allow greater effectiveness of the control surfaces. Further, the examples disclosed herein reduce (e.g., minimize) the need to strengthen/reinforce control surfaces with additional structural components, for example.

The examples disclosed herein have a spoiler disposed on a lower surface of an aerodynamic structure (e.g., a wing, a stabilizer, etc.) of an aircraft to affect and/or reduce loads encountered by control surfaces such as flaps or other spoilers such as upper surface spoilers, for example, of the aerodynamic structure and/or allow the control surfaces to more effectively maneuver the aircraft at significant speeds (e.g., greater than Mach 0.5). In an undeployed state, the lower surface spoiler of the examples disclosed herein at least partially defines a lower surface of the aerodynamic structure. In particular, the lower surface spoiler is not angled away from the lower surface in the undeployed state, thereby partially defining the lower surface in the undeployed state.

To place the lower surface spoiler in a deflected state where the lower surface spoiler is angled away from the lower surface, the lower surface spoiler may be moved (e.g., rotated, angled, actuated, etc.) along with other control surfaces such as a flap and/or another spoiler. For example, the lower surface spoiler may be displaced (e.g., actuated) along with other control surfaces (e.g., flaps, ailerons, flaperons, etc.) via a linkage, a joint and/or linkage system that includes support members/linkages and other components to translate motion. As a result, the examples disclosed herein may be used to enhance effectiveness of corresponding upper surface spoilers in braking by deploying the lower surface spoiler along with the upper surface spoiler. In particular, an actuator may drive an upper surface spoiler to a deployed state which, in turn, rotates a bell crank, for example, thereby causing the lower surface spoiler to deploy along with the upper surface spoiler to affect (e.g., reduce) loads encountered by the upper surface spoiler and/or increase braking effectiveness for the aircraft. In some examples, additionally or alternatively, the lower surface spoiler is deployed in conjunction with a flap that is downstream (e.g., along a direction of airflow) of the lower surface spoiler.

In some examples, the lower surface spoiler is controlled based on input command controls (e.g., flight commands from a cockpit, etc.). In particular, the lower surface spoiler is angled/deflected away from the lower surface of the aerodynamic structure, for example, based on flight input controls during a flight maneuver where the upper surface spoiler and/or the flap is also deflected (e.g., a rapid descent defined through input controls). Additionally or alternatively, the lower spoiler is controlled/deflected based on a flight condition, which is determined from flight sensor data (e.g., flight data indicating that the aircraft is undergoing a rapid descent), for example. In some examples, the lower surface spoiler is rapidly deployed in certain scenarios and/or defined flight conditions by utilizing explosive bolts or an airbag, for example.

As used in the examples disclosed herein, the term "control surface" refers to a component and/or a surface that defines an aerodynamic flow surface used to control flight and/or navigation of an aircraft or other vehicle based on fluid flow (e.g., airflow during movement and/or flight). For example, the term "control surface" may encompass a surface of an aerodynamic structure (e.g., a top surface of a flap) or an actively displaced and/or rotated component such as a flap, spoiler or aileron, for example. As used herein, the term "a chord length" refers to a length along a flow path or airflow direction along a direction of travel of an aircraft, unless described otherwise. As used herein the term "angle from horizontal" of an aircraft refers to an angle and/or relative angles corresponding to a reference plane defined as an angle away from a neutral position of a control surface, whereas the term "horizontal" in this context refers to the neutral position and/or angle of the control surface. As used herein, the term "upper surface" refers to a top surface (e.g., a wing top surface) of an aircraft on opposite side from landing gear of the aircraft while the term "lower surface" refers to a bottom surface side (e.g., a wing bottom surface) that corresponds to the landing gear.

FIG. 1 illustrates an example aircraft 100 in which the examples disclosed herein may be implemented. In the illustrated example, the aircraft 100 includes stabilizers 102 and wings 104 attached to a fuselage 106. The wings 104 of the illustrated example have control surfaces (e.g., flaps, ailerons, tabs, etc.) 108, some of which are located at a trailing edge of the wings 104 and may be displaced or adjusted (e.g., angled, etc.) to provide lift during takeoff, landing and/or flight maneuvers. In some examples, the control surfaces 108 are operated (i.e., displaced) independently of one another. The control surfaces 108 include leading edge flaps 109, leading edge slats 110, upper spoilers (e.g., flight spoilers, ground spoilers, upper surface spoilers, etc.) 112, and trailing edge flaps (e.g., rotatable flaps) 114. The control surfaces 108 of the illustrated example also include ailerons 118 and flaperons 120. In this example, the stabilizers 102 include elevators 122 and a rudder 123. The wings 104 also define upper and lower surfaces (e.g., upper and lower sides, upper and lower aerodynamic surfaces, etc.) 124, 126, respectively.

To control flight of the aircraft 100, the upper surface spoilers 112 of the illustrated example alter the lift and drag of the aircraft 100. The flaps 114 alter the lift and pitch of the aircraft 100. The flaperons 120 and the ailerons 118 of the illustrated example alter the roll of the aircraft 100. In this example, the slats 110 alter the lift of the aircraft 100. The control surfaces 108 of the illustrated example also play a role in controlling the speed of the aircraft 100. For example, the upper surface spoilers 112 may be used for braking of the aircraft 100. Any of the control surfaces 108 of the illustrated example may be independently moved (e.g., deflected) to control the load distribution in different directions over the wing 104, thereby directing movement of the aircraft 100.

The examples described herein may be applied to control surfaces associated with any of the stabilizers 102, the wings 104 and/or any other exterior or outboard structure (e.g., a horizontal stabilizer, a wing strut, an engine strut, a canard stabilizer, etc.) of the aircraft 100. In particular, the wings 104 and/or the stabilizers 102 may have control surfaces 108 that can be adjusted to maneuver the aircraft 100 and/or control a speed of the aircraft 100, for example. Additionally or alternatively, in some examples, the fuselage 106 has control surfaces, which may be deflected, to alter the flight maneuvering characteristics during cruise and/or takeoff of the aircraft 100.

FIG. 2 illustrates an example lower surface structure/spoiler (e.g., a lower surface wedge, a cove door, a cove lip door, lower spoiler assembly, etc.) 202 on the lower surface 126 of the wing 104 of an aircraft (e.g., the aircraft 100 of FIG. 1) in accordance with the teachings of this disclosure. The lower surface spoiler 202 includes a first portion 204, a second portion 206 and a third portion 208. In this example, the first second and third portions 204, 206, 208 are non-contiguous and/or separated from one another, but may form a unitary structure in other examples.

The lower surface spoiler 202 of the illustrated example is placed/positioned on and/or proximate the lower side (e.g., an underside, a lower surface, etc.) 126 of the wing 104. In particular, the lower surface spoiler 202 defines at least a portion and/or surface of the lower side 126 of the example wing 104 when the lower surface spoiler 202 is in an undeployed/undeflected state from its neutral position. In this example, the lower surface spoiler 202 is upstream relative to the flap 114 along a direction of airflow across the wing 104 during flight. Alternatively, the lower surface spoiler 202 may also extend across a span of the wing 104 to a position upstream of the aileron 118 or be placed upstream of the aileron 118, but not the flap 114.

FIG. 3 is a detailed exploded view of the example lower spoiler assembly 202 of FIG. 2. In the view of FIG. 3, the first, second and third portions 204, 206, 208 are shown in a deployed state in which they are angled away from the lower surface 126 of the wing 104. In particular, the first, second and third portions 204, 206, 208 of the illustrated example pivot about an axis 302 defined by a hinge (e.g., a rotatable hinge). In this example, the first portion 204 includes an elongated section 306 divided into segments 308 and 310. Similarly, the second portion 206 is divided into segments 312, 314 and 316, and the third portion 208 is separated into segments 318 and 320. Any of the segments 308, 310, 312, 314, 316, 318 and/or 320 may move independently of one another or in unison.

In operation, the first, second and third portions 204, 206, 208 of the illustrated example pivot (e.g., rotate) downward along the axis 302 and away from the lower surface 126 of the wing 104 to affect and/or reduce loads encountered by the upper surface spoiler 112, thereby increasing an effectiveness (e.g., a maneuvering and/or braking effectiveness) of the upper surface spoiler 112. In some examples, additionally or alternatively, the lower surface spoiler 202 pivots along with the flap 114 to reduce loads encountered by the flap 114. In particular, in some examples, this pivoting enables a Prandtl-Meyer fluid flow expansion on the lower surface 126, thereby reducing loads encountered by the lower surface 126.

In this example, the first, second and third portions 204, 206, 208 pivot away from the wing 104 simultaneously. However, in other examples, any of the first, second and third portions 204, 206, 208 may pivot independently (e.g., may be independently controlled) from one another to vary a degree of loads encountered by the flap 114 and/or the upper surface spoiler 112 to enhance maneuvering and/or braking of the aircraft 100.

The manner in which the lower surface spoiler 202 rotates and/or displaces relative to the wing 104 is described in greater detail below in connection with FIGS. 4-8B. In this example, the first, second and third portions 204, 206, 208 have an approximate ratio defined by a length (e.g., a chord length) of the first, second and third portions 204, 206, 208 to a length (e.g., a chord length) of the upper surface spoiler 112 (along a direction of flight) of approximately 0.2 to 0.45.

FIG. 4 is a cross-sectional view of a portion of the example lower surface spoiler 202 of FIGS. 2 and 3. For clarity, in the view of FIG. 4, the lower surface spoiler 202 is shown in both an undeployed state, which is denoted by solid lines, and a deployed state, which is denoted by dotted lines. In this example, the first portion 204 of the lower surface spoiler 202 includes a pivot (e.g., a hinge, a rotating pivot) 402 that defines the aforementioned axis of rotation 302 of FIG. 3, an outer surface (e.g., an outer wall, a flap wall, etc.) 404, a support bracket 406 having a stop (e.g., a rubber stop) 408 at an angled support 410. In some examples, the lower surface spoiler 202 includes a contact surface 411. In some examples, a spring (e.g., a torsional spring) 412 is operatively (e.g., mechanically) coupled to the pivot 402. In some examples, an interfacing tip (e.g., sealing portion) 414 contacts and/or seals against the flap 114 when the lower surface spoiler 202 is in the undeployed state.

To deploy the lower surface spoiler 202 and/or place the lower surface spoiler 202 at an angle relative to the lower surface 126 to reduce loads encountered by the upper surface spoiler 112 and/or the flap 114 during relatively high speeds (e.g., Mach 0.5 and higher) and/or atypical maneuvers (e.g., rapid descent or ascent, etc.), the lower spoiler 202 rotates about the pivot 402 into a deployed state by a movement device (e.g., an actuator, a pressure relief device, explosive bolts, an airbag, a solenoid, etc.). In some examples, the lower spoiler 202 is biased by the spring 412 into an undeployed state and an actuator and/or other movement device causes the lower spoiler 202 to displace/rotate away from the lower surface 126 against the force of the spring 412 into the deployed state. Alternatively, the lower spoiler surface 202 is biased into the deployed state by the spring 412 and a movement device moves the lower surface spoiler 202 into the undeployed state. As will be discussed in greater detail below in connection with FIGS. 5A-8B, the lower surface spoiler 202 may be deployed/undeployed along with other aerodynamic components or may be moved (e.g., actuated) independently.

To restrict the motion of the lower spoiler surface 202 relative to the lower surface 126, the stop 408, which is cylindrical and composed, at least in part of rubber in this example, is displaced towards the lower surface 126 as the first portion 204 rotates until the stop 408 engages the contact surface 411, thereby limiting the amount of rotation of the lower surface spoiler 202 relative to the lower surface 126.

FIGS. 5A and 5B illustrate deployed and undeployed states, respectively, of an example actuation system 500 in which the lower surface spoiler 202 is moved (e.g., rotated) about the pivot 402 in conjunction with other components, which may include the upper surface spoiler 112 and/or the flap 114. In other words, in the example of FIGS. 5A and 5B, the lower surface spoiler 202 is not displaced/pivoted independently of the upper surface spoiler 112 and/or the flap 114. However, in some examples such as the illustrated example of FIGS. 8A and 8B described below, the lower surface spoiler 202 may be operated independently based on a flight condition(s) and/or flight input(s), for example.

Turning in detail to FIG. 5A, to drive and couple motion of the lower surface spoiler 202 to the upper surface spoiler 112, the example actuation system 500 includes an actuator 502, a rotational joint (e.g., a coupling pivot, a bell crank, a rotating joint, a pivoting crank, etc.) 508 that defines an axis of rotation 509, a rotational pivot 510 of the upper surface spoiler 112, a pivot 512 of the flap 114 and arms 516 (e.g., linkages, cams and/or displacement cables, etc.). As can be seen in the illustrated example of FIG. 5A, in an undeployed state of the lower surface spoiler 202 and the upper surface spoiler 112, the lower surface spoiler 202 at least partially defines the lower surface 126 while the upper surface spoiler 112 at least partially defines the upper surface 124. In this example, when the flap 114 is rotated about the pivot 512 into its respective neutral position, the flap 114 also at least partially defines the upper surface 124 and the lower surface 126.

To couple motion of the upper surface spoiler 112 to the lower surface spoiler 202, the arms 516 operatively join the coupling joint 508 to the upper surface spoiler 112 and the lower surface spoiler 202. In particular, this mechanical coupling/physical arrangement and/or resultant kinematic motion of the illustrated example enables simultaneous rotation of the lower surface spoiler 202 when the upper surface spoiler 112 is angled/deflected from the upper surface 124 in response to a driving input from the actuator 502. Additionally or alternatively, the arms 516 may also be operatively coupled to the flap 114 such that the flap 114 may be rotated about the pivot 512 in conjunction with at least one of the upper surface spoiler 112 or the lower spoiler 202.

In some examples, the actuation system 500 also includes a clutch 518, which may be used to vary a degree of coupling and/or relative angular motion between the upper surface spoiler 112, the flap 114 and/or the lower spoiler 202. However, the clutch 518 may be used to vary a degree of rotational coupling between any of the upper surface spoiler 112, the lower spoiler 202 and/or the flap 114 (e.g., a degree to which they are moved/displaced/rotated by the actuator 502 relative to one another). However, in this example, the flap 114 rotates independently of the upper surface spoiler 112 and the lower surface spoiler 202. In some examples, the clutch 518 may couple/decouple motion of the flap 114 from the lower spoiler 202 and/or the upper surface spoiler 112 based on flight input and/or flight condition(s).

In some examples, at least one of the upper surface spoiler 112 or the lower spoiler 202 is spring loaded to be biased into either a deployed/open position or an undeployed/closed position. In some examples, the actuator 502 is operatively coupled to the coupling joint 508 and/or the arms 516 to direct the motion/actuation of the both the upper surface spoiler 112 and the lower spoiler 202 simultaneously, for example.

Turning to FIG. 5B, the lower surface spoiler 202 along with the upper surface spoiler 112 are shown in a deployed position. As described above in connection with FIG. 5A, movement of the upper surface spoiler 112 is coupled to movement of the lower spoiler 202 (e.g., during a braking maneuver). As can be seen in the view of FIG. 5B, the lower surface spoiler 202 is rotated about the pivot 402 in response to movement of the coupler 508 that is caused by a deflection of the upper surface spoiler 112 about the pivot 510 due to a driving motion of the actuator 502 that is translated via the arms 516. As a result, the upper surface spoiler 112 is rotated about the pivot 510 at an angle (e.g., an angle of rotation) 530, which is denoted by "$\theta s$." Likewise, the lower surface spoiler 202 is rotated about the pivot 402 to an angle 532, which is denoted by "$\theta_{ms}$."

In this example, the lower surface spoiler 202 defines a deflected height 534, which is denoted by "h." The deflected height 534 of the illustrated example is approximately 1 to 2.5% (e.g., 1.5 to 2% in certain examples) of the chord length (e.g., from leading edge to trailing edge) of the wing 104. Selecting a deflected height to have such a size factor and/or proportional relationship to the chord length is effective to reduce loads of other control surfaces (e.g., other spoilers and/or flaps). In some examples, the deflected height 534 is controlled and/or altered relative to a deflected height of the upper surface spoiler 112. For example, the deflected height 534 may be relatively small at low deflection heights of the upper surface spoiler 112, then increase significantly along with the heights of the upper surface spoiler 112, and then dwell at relatively high deflection heights of the upper surface spoiler 112.

In some examples, a first gap defined by the upper surface spoiler 112 in a deployed state and a second gap defined by the lower surface spoiler 202 in its respective deployed state define a flow 538 between the first and second gaps.

FIG. 5C illustrates an example angular displacement plot 540 of the actuation system 500. The displacement plot 540 includes a horizontal axis 542 that indicates an angular displacement of the upper surface spoiler 112 (e.g., the angle 530) while a vertical axis 544 indicates an angular displacement of the lower surface spoiler 202 (e.g., the angle 532). As can be seen by a curve 546 of the plot 540, a degree to which the lower surface spoiler 202 rotates relative (e.g., relative angular motion, degree of relative angular motion) to the upper surface spoiler 112 is exhibited by a generally linear behavior of a linear portion 548. Therefore, a degree to which the lower surface spoiler 202 rotates with the upper surface spoiler 112 is generally defined by a slope of the linear portion 548. Additionally, the angular relationship between the lower surface spoiler 202 and the upper surface spoiler 112 exhibits non-linear behavior in a non-linear portion 550, which also includes an inflection point 552. The example angular relationship of FIG. 5C is only an example and any other appropriate angular relationship may be used based on aircraft design, component design and/or flight dynamics, etc.

FIG. 6A illustrates a deployed state of an example actuation system 600, which is similar to the example actuation system 500 of FIG. 5. However, in contrast to the example actuation system 500, the lower surface spoiler 202 is moved (e.g., rotated) along the pivot axis 402 along with the upper surface spoiler 112, but to different degrees or in accordance with a varying proportion across different angular displacement ranges (e.g., different displacement angles, different angular displacements). In particular, the lower surface spoiler 202 of the illustrated example rotates at a relatively smaller amount relative to the rotation of the upper surface spoiler 112 when the upper surface spoiler 112 is not significantly rotated from its neutral position (e.g., a movement of less than 10 degrees of the upper surface spoiler 112 from its neutral/undeployed position). However, the lower surface spoiler 202 increases an amount of rotation relative to the upper surface spoiler 112 as the upper surface spoiler 112 is rotated further away (e.g., at higher angles than 10 degrees) from the neutral position. The example actuation system 600 includes a pivot (e.g., a pivoting joint, a bell crank, etc.) 602, which couples motion of the upper surface spoiler 112 to the lower surface spoiler 202 and has a corresponding axis of rotation 604, an actuator 606 and mechanical couplings (e.g., driving arms, linkages, etc.) 608.

To vary a degree of relative motion between the upper surface spoiler 112 to the lower surface spoiler 202 along different angular displacement angles, the appropriate kinematic relationships and/or lengths of the mechanical couplings 608 along with a relative position and/or shape of the pivot 602 are defined based on motion/displacement requirements (e.g., angular displacements and/or variation between angular displacements, etc.). In particular, lengths and/or positions of the mechanical couplings 608, pivoting ends/portions of the mechanical couplings 608, the number of the mechanical couplings 608 (e.g., a four bar linkage, etc.) are defined and/or selected to define varied relative motion between the upper surface spoiler 112 and the lower surface spoiler 202 at different rotational angles.

In this example, the actuator 606 drives the upper surface spoiler 112 which, in turn, rotates the pivot 602 along with the lower surface spoiler 202 via the mechanical couplings 608. In some examples, the pivot 602 is driven by the actuator 606, thereby rotating the upper surface spoiler 112 and the lower surface spoiler 202. In some examples, the actuator 606 drives only the lower surface spoiler 202 independently of the upper surface spoiler 112 and the flap 114 (e.g., based on flight conditions and/or flight input).

FIG. 6B illustrates an example angular displacement plot 620 of the actuation system 600. The displacement plot 620 includes a horizontal axis 622 that indicates an angular displacement of the upper surface spoiler 112 while a vertical axis 624 indicates an angular displacement of the lower surface spoiler 202. In contrast to the plot 540 of FIG. 5C and as can be seen by a curve 626, a degree to which the lower surface spoiler 202 rotates relative to the upper surface spoiler 112 exhibits variation over the range of angular positions (e.g., a varying slope across different angular positions) in this example. In particular, as the upper surface spoiler 112 rotates near its neutral position at a region 628 of the curve 626, the lower surface spoiler 202 rotates a smaller amount relative to (i.e., fewer degrees per degree) the rotation of the upper surface spoiler 112 (e.g., at rotational displacements of the upper surface spoiler 112 that are less than 10 degrees).

However, in a region 630 of the curve 626 at a significant range beyond a neutral position of the upper surface spoiler 112, the lower surface spoiler 202 rotates a higher rate (i.e., a greater number of degrees per degree of rotation of the upper surface spoiler 112) in comparison to the region 628. Therefore, a degree to which the lower surface spoiler 202 rotates along with the upper surface spoiler 112 is not generally uniform and/or linear, as shown in the illustrated example of FIG. 5C until the region 630. In contrast to the example set forth in FIG. 5C, the plot 620 exhibits the non-linear region 628 at lower angular displacements instead of at relatively high angular displacements of the upper surface spoiler 112.

Additionally or alternatively, angular displacement of the lower surface spoiler 202 may be linked to angular displacement of the flap 114 (e.g., the horizontal axis 622 may represent movement of the flap 114). The example angular relationship of FIG. 6B is only an example and other appropriate angular relationship(s) may be used based on aircraft design, component design and/or flight dynamics, etc.

FIGS. 7A and 7B illustrate deployed and undeployed states, respectively, of yet another example actuation system 700. Turning to FIG. 7A, the example actuation system 700 includes a single link and/or linkage 702 having a first pivoting end 704 and a second pivoting end 706. The example actuation system 700 also includes an actuator 708 that drives the upper surface spoiler 112.

In operation, the single link 702 of the illustrated example couples and controls motion of the lower surface spoiler 202 relative to the upper surface spoiler 112. In particular, the link 702 of the illustrated example is caused to displace by a driving input of the actuator 708 to the upper surface spoiler 112, thereby coupling motion between the upper surface spoiler 112 and the lower surface spoiler 202 without use of a bell crank, for example.

Turning to FIG. 7B, the actuation system 700 is shown in a deployed state in which the upper surface spoiler 112 has been rotated by the actuator 708 to an angle 720, which is depicted by "$\theta_s$." Likewise, the lower surface spoiler 202 is rotated to an angle 722, which is depicted by "$\theta_{ms}$," based on pivoting and/or rotation of the link 702. As the lower surface spoiler 202 is rotated to this deployed position, the lower surface spoiler 202 defines a height 724, which is depicted by "h," based on the motion of the linkage 702. The height 724 of the illustrated example is approximately 1-2.5% (e.g., 1.5 to 2% in certain examples) of a chord length (e.g., a flowwise length from a leading edge to a trailing edge) of the wing 104 to reduce loads encountered by the upper surface spoiler 112, for example.

FIG. 7C is a graph 730 depicting relative motion between the lower surface spoiler 202 and the upper surface spoiler 112 of the example actuation system 700 of FIGS. 7A and 7B. The graph 730 has a vertical axis 732, which represents the angle 722 of the lower surface spoiler 202. The graph 730 also has a horizontal axis 734, which represents the angle 720 of the upper surface spoiler 112. As can be seen from the graph 730, the linkage 702 defines the characteristic shape of the curve 736 including different curved regions having varying slopes. While an example angular relationship is shown between the upper surface spoiler 112 and the lower surface spoiler 202, any appropriate curve shape of the curve 736 may be defined to accommodate a particular application, and/or aerodynamic shape or property. As a result, the example angular relationships of the examples disclosed herein may be altered and/or characterized to meet aerodynamic design and/or application needs.

FIGS. 8A and 8B illustrate deployed and undeployed states, respectively, of another example actuation system 800 in which spoilers are operated/deflected independently from one another. Turning to FIG. 8A, the example actuation system 800 includes an upper surface spoiler actuator 802 that is operatively coupled to a joint 804 of the upper surface spoiler 112. Likewise, the example actuation system 800 also includes a lower surface spoiler actuator 806 that is operatively coupled to a joint 808 of the lower surface spoiler 202. In contrast to the examples actuation systems 500, 600, 700 described above in connection with FIGS. 5A-7C respectively, the upper surface spoiler 112 and the lower surface spoiler 202 are independently actuated relative to one another. However, movement of both the upper surface spoiler 112 and the lower surface spoiler 202 of the illustrated example may be coordinated via a control circuit and/or an actuation control system, for example.

FIG. 8B shows the example actuation system 800 in a deployed state of the lower spoiler 202. In particular, the actuator 802 of the illustrated example has not moved the upper surface spoiler 112 into its deployed state. However, the actuator 806 has moved the lower surface spoiler 202 into its deployed state. In some examples, the actuator 806 may include a lower surface airbag that is deployed and/or inflated to move the lower surface spoiler 202. In other examples, the actuator 806 may move a panel which, in turn, moves the lower surface spoiler 202 into a deployed state. Alternatively, in some examples, the lower spoiler 202 is moved into the deployed state via a release mechanism. In particular, a release mechanism/device such as a blow-out panel or a pressure-release device is used to move the lower spoiler 202 into the deployed state (e.g., independently of the upper surface spoiler 112).

Figure 9:
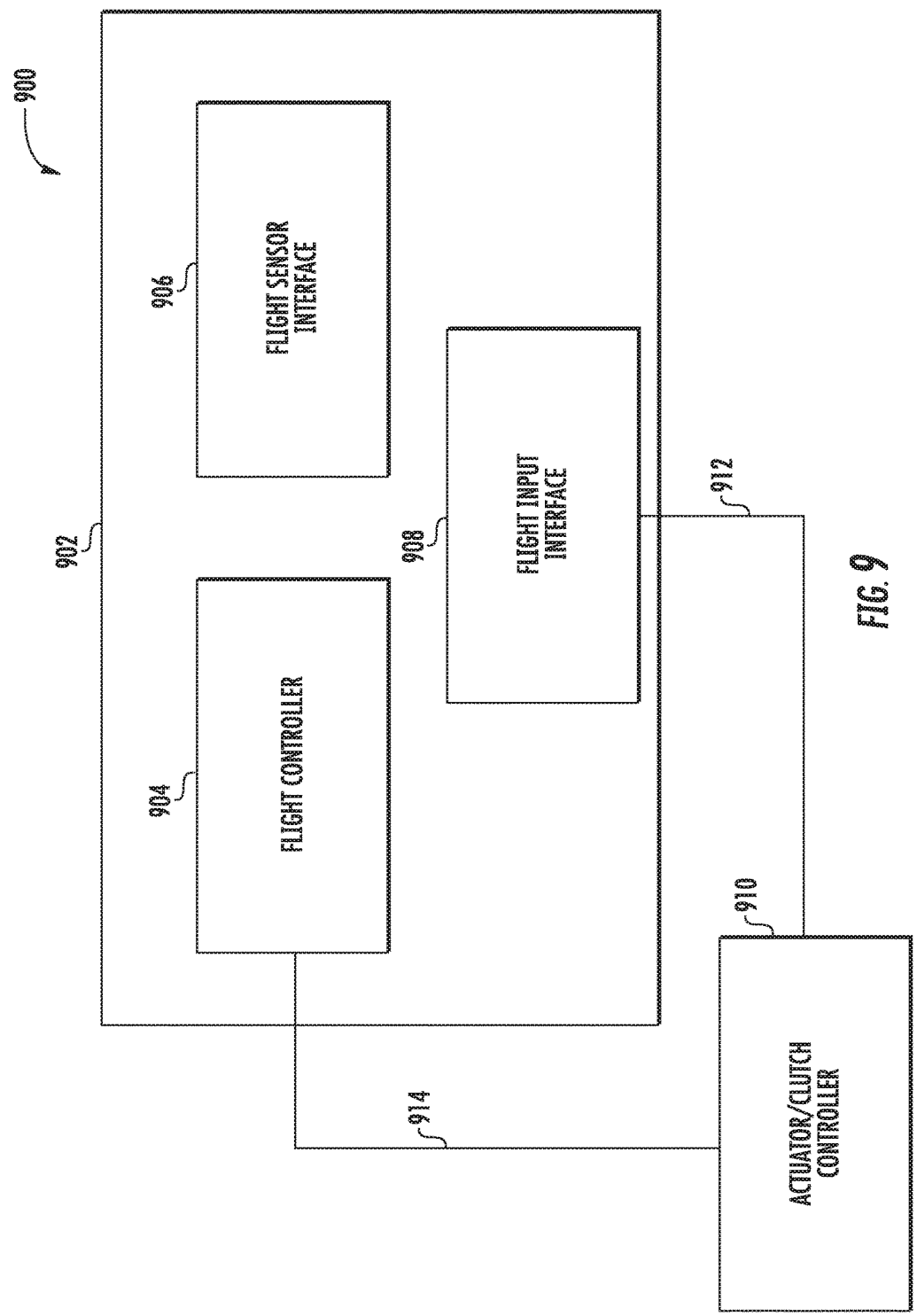
FIG. 9 is a schematic overview of an example lower surface spoiler control system that may be used to implement the examples disclosed herein.

FIG. 9 is an example lower spoiler control system 900 that may be used to implement the examples disclosed herein. The example lower spoiler control system 900 includes a flight computation system 902, which includes a flight controller 904, a flight sensor interface 906 and a flight input interface 908. The example lower surface spoiler control system 900 also includes an actuator/clutch controller 910 that is communicatively coupled to the flight input interface 908 via communication lines 912 and also communicatively coupled to the flight controller 904 via communication lines 914.

In operation, to control/maneuver an aircraft (e.g., the aircraft 100) and/or control a lower surface spoiler such as the lower surface spoiler 202, the flight input interface 908 may receive a maneuvering command (e.g., an input control movement) from a cockpit interface via the communication line 912, for example. Based on this maneuvering command, the actuation/clutch controller 910 of the illustrated example directs movement of an actuator (e.g., the actuator 502, the actuator 606, the actuator 708, the actuator 802, the actuator 806). In some examples, the flight controller 904 processes the maneuvering command from the flight interface 908 to direct the actuator/clutch controller 910 via the communication line 914, for example. In some examples, the flight controller 904 coordinates deflection/rotation of the lower surface spoiler in tandem with another control surface (e.g., coordinates operation of independent actuators driving the lower surface spoiler and another control surface).

Additionally or alternatively, the aircraft is maneuvered and/or the lower surface spoiler is controlled based on flight sensor data from the flight sensor interface 906. The flight sensor interface 906 of the illustrated example may include an interface to spoiler position/deflection sensors, a flap load sensor, a control surface deformation sensor and/or pressure sensor(s). The flight sensor data may include, but is not limited to, flight speed, altitude, attitude, flight status, flight mode(s), braking conditions and/or air conditions, etc. In some examples, the flight controller 904 utilizes the sensor data and/or flight input data from the flight input interface 908 to direct the actuator/clutch controller 910 via the communication line 914.

In some examples, the actuation/clutch controller 910 varies a degree of movement between one or more control surfaces (e.g., flaps, upper spoiler(s), lower surface spoiler(s), etc.) based on flight inputs and/or the sensor data by controlling a clutch (e.g., the clutch 518). Additionally or alternatively, control and/or movement of a control surface is coupled/decoupled from an actuator by the actuation/clutch controller 910.

While an example manner of implementing the lower spoiler control system 900 is illustrated in FIG. 9, one or more of the elements, processes and/or devices illustrated in FIG. 9 may be combined, divided, re-arranged, omitted, eliminated and/or implemented in any other way. Further, the example flight computation system 902, the example flight controller 904, the example flight sensor interface 906, the example flight input interface 908, the actuator/clutch controller 910 and/or, more generally, the example lower spoiler control system 900 of FIG. 9 may be implemented by hardware, software, firmware and/or any combination of hardware, software and/or firmware. Thus, for example, any of the example flight computation system 902, the example flight controller 904, the example flight sensor interface 906, the example flight input interface 908, the actuator/clutch controller 910 and/or, more generally, the example lower spoiler control system 900 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example flight computation system 902, the example flight controller 904, the example flight sensor interface 906 and/or the example flight input interface 908, the actuator/clutch controller 910 is/are hereby expressly defined to include a tangible computer readable storage device or storage disk such as a memory, a digital versatile disk (DVD), a compact disk (CD), a Blu-ray disk, etc. storing the software and/or firmware. Further still, the example lower spoiler control system 900 of FIG. 9 may include one or more elements, processes and/or devices in addition to, or instead of, those illustrated in FIG. 9, and/or may include more than one of any or all of the illustrated elements, processes and devices.

Figure 10:
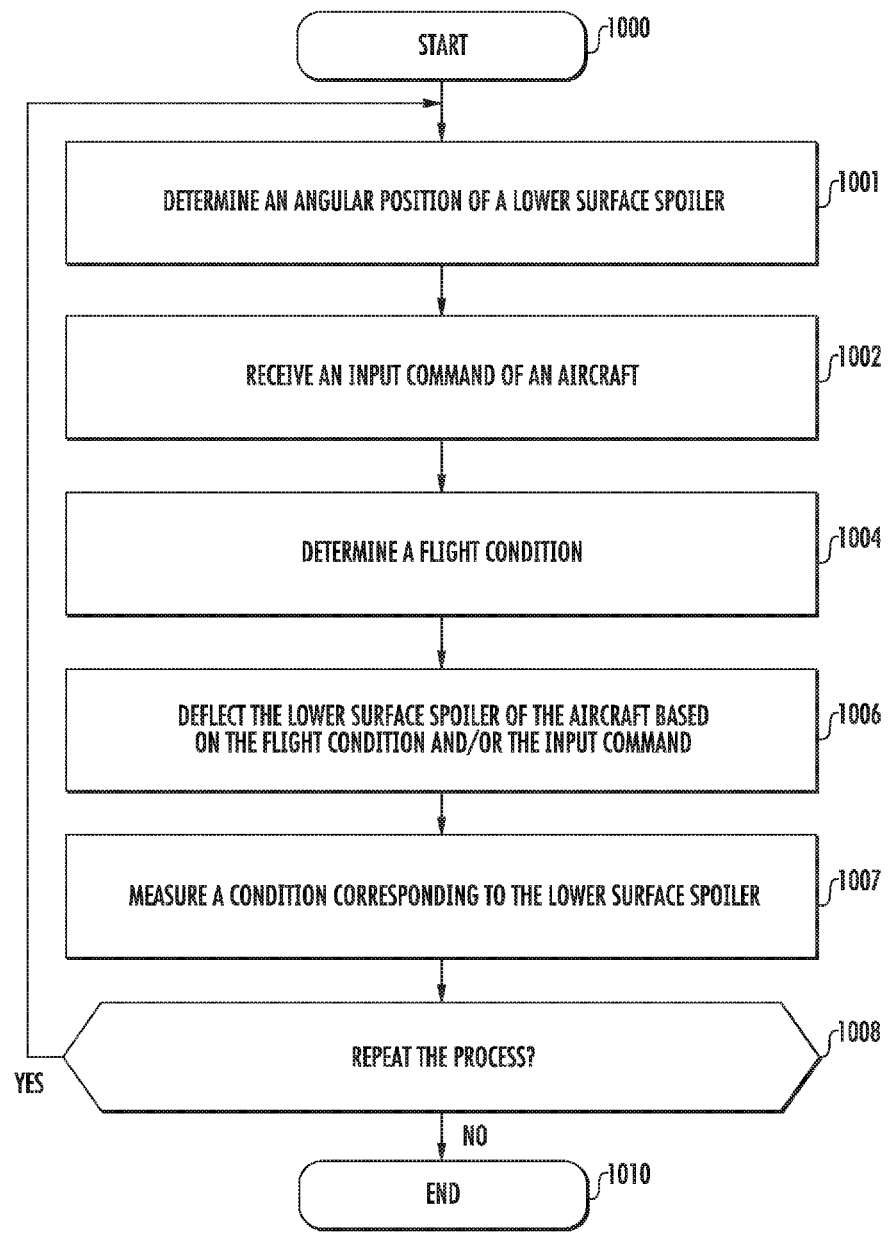
FIG. 10 is a flowchart representative of an example method that may be used to implement the example lower surface spoiler control system of FIG. 9.

A flowchart of an example method for implementing the example lower spoiler control system 900 of FIG. 9 is shown in FIG. 10. In this example, the method may be implemented using machine readable instructions that comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example method is described with reference to the flowchart illustrated in FIG. 10, many other methods of implementing the example lower spoiler control system 900 may alternatively be used. For example, the order of execution of the blocks may be changed, and/or some of the blocks described may be changed, eliminated, or combined.

As mentioned above, the example method of FIG. 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 10 begins at block 1000 where an aircraft (e.g., the aircraft 100) is in flight (block 1000). In this example, the aircraft is travelling at a relatively high speed (e.g., a speed greater than Mach 0.4) and is about to undergo a maneuver (e.g., a rapid dive maneuver) that will cause the aircraft speed to exceed Mach 0.9. In this example, at least one of an upper surface spoiler (e.g., the upper surface spoiler 112) and/or a flap (e.g., the flap 114) are rotated from a neutral/horizontal position or are about to be rotated as part of the maneuver.

In this example, an angular position of a lower surface spoiler of the aircraft is determined (block 1001). For example, the angular position may be determined based on spoiler sensor data (e.g., from position sensors), measured spoiler deflections, etc.

A flight input command is received at a flight input interface such as the flight input interface 908 of FIG. 9 (block 1002). For example, the flight input command may be a command to reduce speed and/or lift of the aircraft or to move a flap (e.g., the flap 114) to a certain angle.

Next, in some examples, a flight condition is determined (block 1004). For example, sensor data (e.g., speed, altitude, etc.) is received from sensors via a sensor interface such as the flight sensor interface 906.

The lower surface spoiler is deflected based on the flight input command (block 1006). For example, a lower surface spoiler (e.g., the lower surface spoiler 212, a cove lip door, etc.) is angled away from a lower surface (e.g., the lower surface 126) to reduce loads on a flap (e.g., the flap 114) and/or an upper spoiler (e.g., the upper spoiler 112) during the maneuver, for example. Additionally or alternatively, in some examples, the deflection of the lower surface spoiler is solely and/or primarily based on the flight condition. In some examples, the lower surface spoiler is deflected along with at least one of the upper surface spoiler or the flap (e.g., movement of different actuators is coordinated). In some examples, the lower surface spoiler deflection is at least partially based on the angular position of the lower surface spoiler, flap loads (e.g., flap loads measured from load cells), In some examples, a condition corresponding to the lower surface spoiler is measured (block 1007). For example, a load of a flap may be measured via a load cell. Additionally or alternatively, the angular position of the lower surface spoiler may be measured/re-measured. In some examples, differential flap pressures and/or flap deformation is measured.

Next, it is determined if the process is to be repeated (block 1008). If the process is to be repeated (block 1008), control of the process returns to block 1001. If the process is not to be repeated (block 1008), the process ends (block 1010). This determination may be based on a flight mode and/or detected flight conditions, for example. In some examples, this determination may be made based on the angular position of the lower surface spoiler, the flap load, the differential flap pressure and/or the flap deformation, thereby defining a feedback loop, for example.

Figure 11:
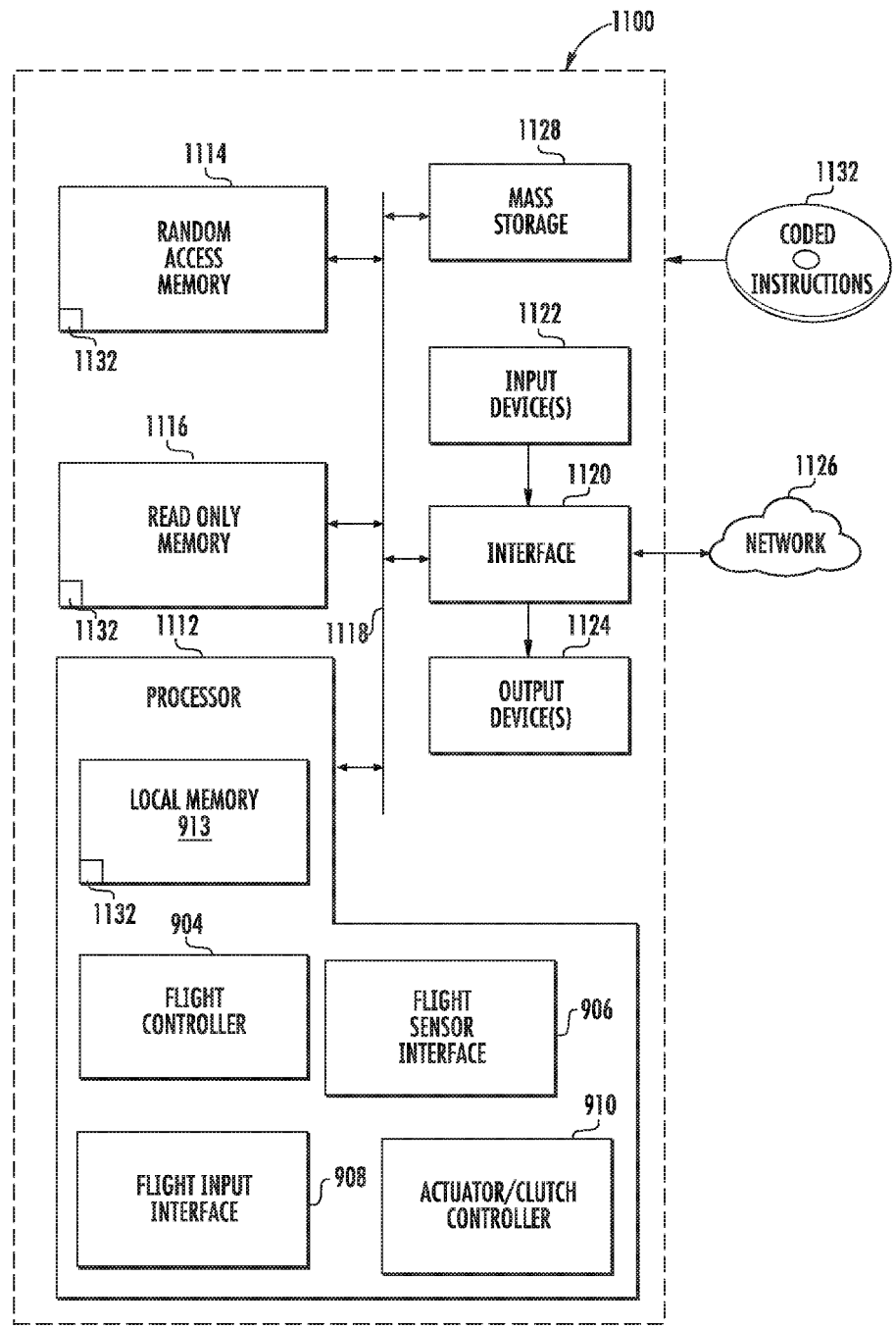
FIG. 11 is a block diagram of an example processor platform capable of executing machine readable instructions to implement the example method of FIG. 10.

FIG. 11 is a block diagram of an example processor platform 1100 capable of executing the example method of FIG. 10 to implement the example lower spoiler control system 900 of FIG. 9. The processor platform 1100 can be, for example, a server, a personal computer, a mobile device (e.g., a cell phone, a smart phone, a tablet such as an iPadTM), a personal digital assistant (PDA), a digital video recorder, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). In this example, the processor 1112 also includes the flight controller 904, the flight sensor interface 906, the flight input interface 908 and the actuator/clutch controller 910. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 128 for storing software and/or data. Examples of such mass storage devices 1128 include floppy disk drives, hard drive disks, compact disk drives, Blu-ray disk drives, RAID systems, and digital versatile disk (DVD) drives.

Coded instructions 1132 to implement the example method of FIG. 7 may be stored in the mass storage device 1128, in the volatile memory 1114, in the non-volatile memory 1116, and/or on a removable tangible computer readable storage medium such as a CD or DVD.

FIG. 12 is an example graph 1200 that illustrates spoiler effectiveness of the examples disclosed herein. The example graph 1200 includes a vertical axis 1202 that depicts a unitless percentage of spoiler effectiveness (e.g., of an upper surface spoiler that is enhanced by a lower surface spoiler in accordance with the teachings of this disclosure). The example graph 1200 also includes a horizontal axis 1204 that indicates an angle of a spoiler (e.g., an upper spoiler). As can be seen from the graph 1200, the examples disclosed herein greatly increase spoiler effectiveness at angles of 5 degrees, especially at Mach numbers between approximately 0.4 and 0.96, amongst other ranges.

From the foregoing, it will be appreciated that the above disclosed methods and apparatus decrease loads on control surfaces, thereby allowing greater effectiveness of the control surfaces. Further, the examples disclosed herein reduce a need for structural support of these control surfaces, which can lead to increased weight, etc.

Although certain example methods and apparatus have been disclosed herein, the scope of coverage of this patent is not limited thereto. On the contrary, this patent covers all methods, apparatus and articles of manufacture fairly falling within the scope of the claims of this patent. While aircraft are described, the example apparatus may be applied to vehicles, aerodynamic structures, etc.

What is claimed is:

1. An apparatus comprising:
a first spoiler of an aerodynamic structure of an aircraft, the first spoiler to deflect away from a first side of the aerodynamic structure;
a second spoiler on a second side of the aerodynamic structure opposite of the first side, the second spoiler to deflect away from the second side to reduce a load on at least one of the first spoiler or a flap of the aerodynamic structure, wherein the second spoiler has a deflected height that is 1 to 2.5% of a chord length of the aerodynamic structure; and
a clutch operatively coupled between the first and second spoilers, the clutch to couple a motion between the first and second spoilers in a first mode of the clutch, the clutch to decouple the motion between the first and second spoilers in a second mode of the clutch.

2. The apparatus as defined in claim 1, wherein a ratio of a chord length of the second spoiler to a chord length of the first spoiler is 0.2 to 0.45.

3. The apparatus as defined in claim 1, wherein the flap is downstream of the second spoiler.

4. The apparatus as defined in claim 1, wherein the clutch is to vary a degree of relative motion between the first and second spoilers based on a flight input.

5. The apparatus as defined in claim 1, wherein a relationship of motion between the first and second spoilers exhibits linear and non-linear portions.

6. The apparatus as defined in claim 1, wherein the clutch is to decouple the motion between the first and second spoilers based on a flight input.

7. The apparatus as defined in claim 1, wherein the second spoiler is operatively coupled to the first spoiler via at least one linkage, the linkage to couple a rotational motion of the second spoiler to the first spoiler.

8. The apparatus as defined in claim 7, wherein an angular movement of the second spoiler relative to the first spoiler varies over an angular range of the second spoiler.

9. The apparatus as defined in claim 7, further including a pivoting crank of the at least one linkage.

10. The apparatus as defined in claim 9, further including an actuator to rotate the pivoting crank to rotate the first and second spoilers.

11. The apparatus as defined in claim 1, wherein the flap includes a flap proximate a trailing edge of the aerodynamic structure.

12. The apparatus as defined in claim 11, further including a sealing portion to form a seal between the second spoiler and a leading edge of the flap.

13. A wing of an aircraft comprising:
a first rotatable joint of the wing, the first rotatable joint to define a first axis of rotation of a first spoiler that is to deflect away from a first side of the wing along the first axis of rotation;
a second rotatable joint of the wing, the second rotatable joint to define a second axis of rotation of a second spoiler on a second side of the wing opposite the first side, the second spoiler to deflect away from the second side along the second axis of rotation, wherein the second spoiler has a deflected height that is 1 to 2.5% of a chord length of the wing;
at least one linkage to operatively couple rotational motion of the second rotatable joint to rotational motion of the first rotatable join; and
a clutch operatively coupled between the first and second spoilers, the clutch to couple a motion between the first and second spoilers in a first mode of the clutch, the clutch to decouple the motion between the first and second spoilers in a second mode of the clutch.

14. The wing as defined in claim 13, further including a third rotatable joint of a flap.

15. The wing as defined in claim 13, wherein the at least one linkage varies a relative angular motion of the second spoiler to the first spoiler over an angular range of the first spoiler.

16. The wing as defined in claim 13, wherein the clutch is to vary a relative angular motion between the first and second rotatable joints.

17. A method comprising:
based on at least one of a flight input or a flight condition, rotating at least one of an upper surface spoiler that is positioned on a first side of an aerodynamic structure of an aircraft or a flap of the aerodynamic structure;
rotating a lower surface spoiler positioned on a second side of the aerodynamic structure of the aircraft that is opposite of the first side to affect a load on at the least one of the upper surface spoiler or the flap that is rotated, wherein rotating the lower surface spoiler includes rotating the lower surface spoiler to a deflected height that is 1 to 2.5% of a chord length of the aerodynamic structure; and
varying a degree of relative motion between the lower surface and upper surface spoilers, via a clutch operatively coupled between the lower surface and upper surface spoilers, the clutch to couple a motion between the lower surface and upper surface spoilers in a first mode of the clutch, the clutch to decouple the motion between the lower surface and upper surface in a second mode of the clutch.

18. The method as defined in claim 17, wherein the degree to which the lower surface spoiler rotates relative to the upper surface spoiler varies over different angles of rotation of the upper surface spoiler.

19. The method as defined in claim 17, wherein a ratio of a chord length of the lower surface spoiler to a chord length the upper surface spoiler is between 0.2 to 0.45.

20. An apparatus comprising:
a first spoiler on a lower surface of a wing of an aircraft, the first spoiler to have a deployed height of 1 to 2.5% of a chord length of the wing in a deployed state;
a second spoiler on an upper surface of the wing; and
a clutch operatively coupled between the first and second spoilers, the clutch to couple a motion between the first and second spoilers in a first mode of the clutch, the clutch to decouple the motion between the first and second spoilers in a second mode of the clutch.

21. The apparatus as defined in claim 20, further including at least one linkage to couple motion of the first spoiler to the second spoiler.

22. The apparatus as defined in claim 21, wherein a relative angular motion between the first and second spoilers varies over an angular range of the first spoiler.

23. The apparatus as defined in claim 22, wherein a ratio of a chord length of the first spoiler to a chord length of the second spoiler is 0.2 to 0.45.

\* \* \* \* \*